US008530068B2

(12) United States Patent
Urano et al.

(10) Patent No.: US 8,530,068 B2
(45) Date of Patent: Sep. 10, 2013

(54) SQUARE BATTERY AND MANUFACTURING METHOD OF THE SAME

(75) Inventors: Kazuaki Urano, Otsu (JP); Fujio Hirano, Hiratsuka (JP)

(73) Assignee: Hitachi Vehicle Energy, Ltd., Ibaraki (JP)

( * ) Notice: Subject to any disclaimer, the term of this patent is extended or adjusted under 35 U.S.C. 154(b) by 0 days.

(21) Appl. No.: 13/578,310

(22) PCT Filed: Mar. 10, 2010

(86) PCT No.: PCT/JP2010/054047
§ 371 (c)(1),
(2), (4) Date: Aug. 10, 2012

(87) PCT Pub. No.: WO2011/111196
PCT Pub. Date: Sep. 15, 2011

(65) Prior Publication Data
US 2012/0315525 A1    Dec. 13, 2012

(51) Int. Cl.
*H01M 4/00*    (2006.01)
(52) U.S. Cl.
USPC .................. 429/94; 429/161; 429/233
(58) Field of Classification Search
None
See application file for complete search history.

(56) References Cited

U.S. PATENT DOCUMENTS

| 6,485,859 | B1 * | 11/2002 | Szyszkowski | 429/66 |
| 7,070,881 | B2 * | 7/2006 | Kishiyama et al. | 429/161 |
| 2003/0129479 | A1 | 7/2003 | Munenaga et al. | |
| 2007/0105015 | A1 | 5/2007 | Munenaga et al. | |

FOREIGN PATENT DOCUMENTS

| JP | 2002-93402 A | 3/2002 |
| JP | 2002-134157 A | 5/2002 |
| JP | 2003-346771 A | 12/2003 |
| JP | 2005-183332 A | 7/2005 |
| JP | 2008-4274 A | 1/2008 |
| JP | 4061938 B2 | 3/2008 |

* cited by examiner

*Primary Examiner* — Milton I Cano
*Assistant Examiner* — Carmen Lyles-Irving
(74) *Attorney, Agent, or Firm* — Volpe and Koenig, P.C.

(57) ABSTRACT

A positive electrode sheet and a negative electrode sheet are laminated and wound around a shaft core 126 while being insulated by a separator. Spreading operation plates 90P and 90N are fitted to both ends of the shaft core 126 in a winding axis direction, and operation protrusions 91A to 92B of the spreading operation plates 90P and 90N protrude from both flat end surfaces of a wound body 120. The spreading operation plates 90P and 90N are spread, so that laminate parts of a positive electrode connection part 122A and a negative electrode connection part 124A are pushed and extended outward on the flat end surfaces of the wound body 120, and V-shaped openings 120V continuous with the innermost peripheries of the wound body 120 are formed. The laminate parts are welded to positive and negative electrode current collectors 115 and 116.

9 Claims, 14 Drawing Sheets

FIG. 3
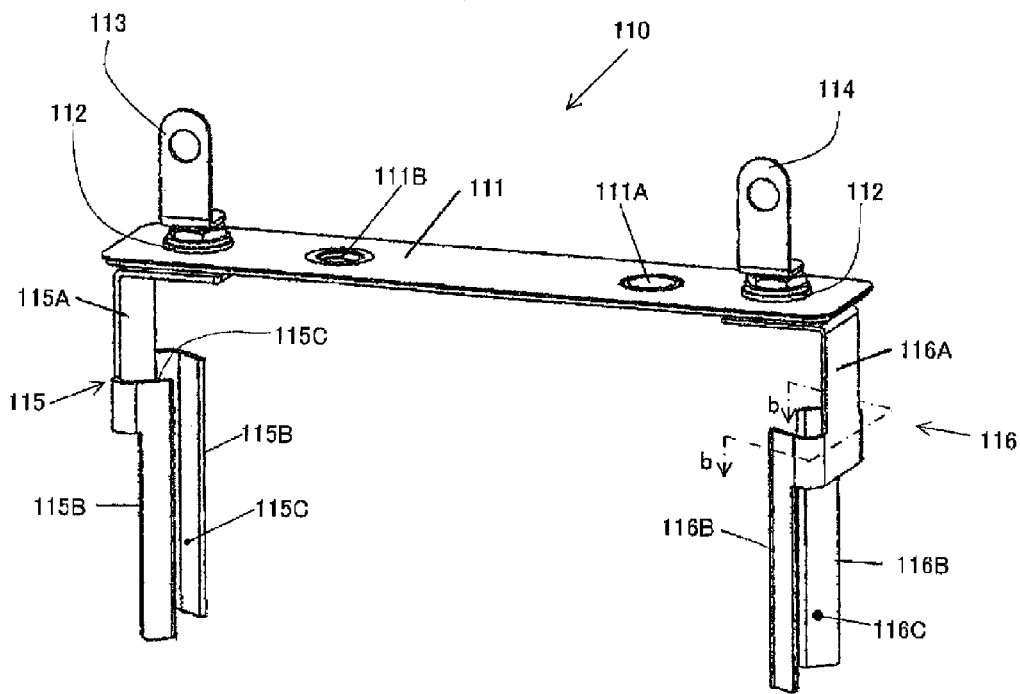
(a)
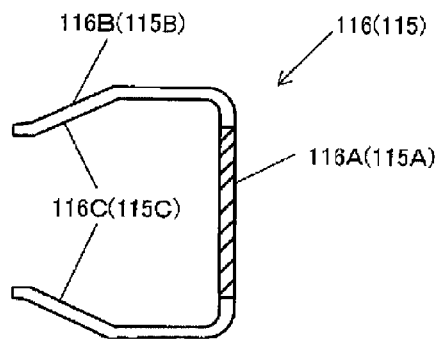
(b)

FIG. 7
(a)
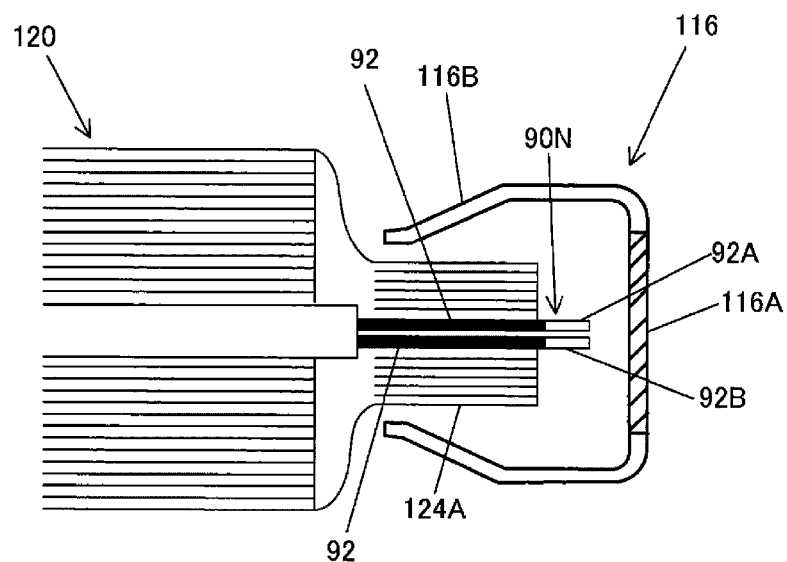
(b)
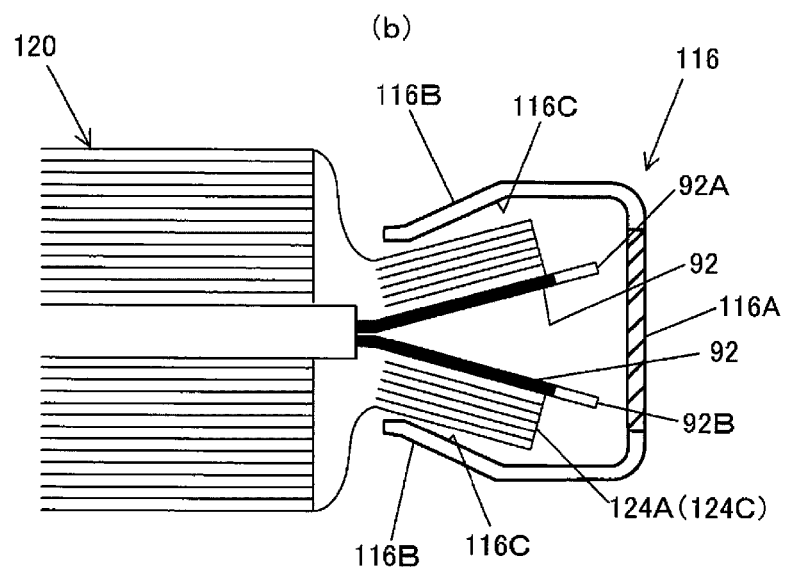

FIG. 9
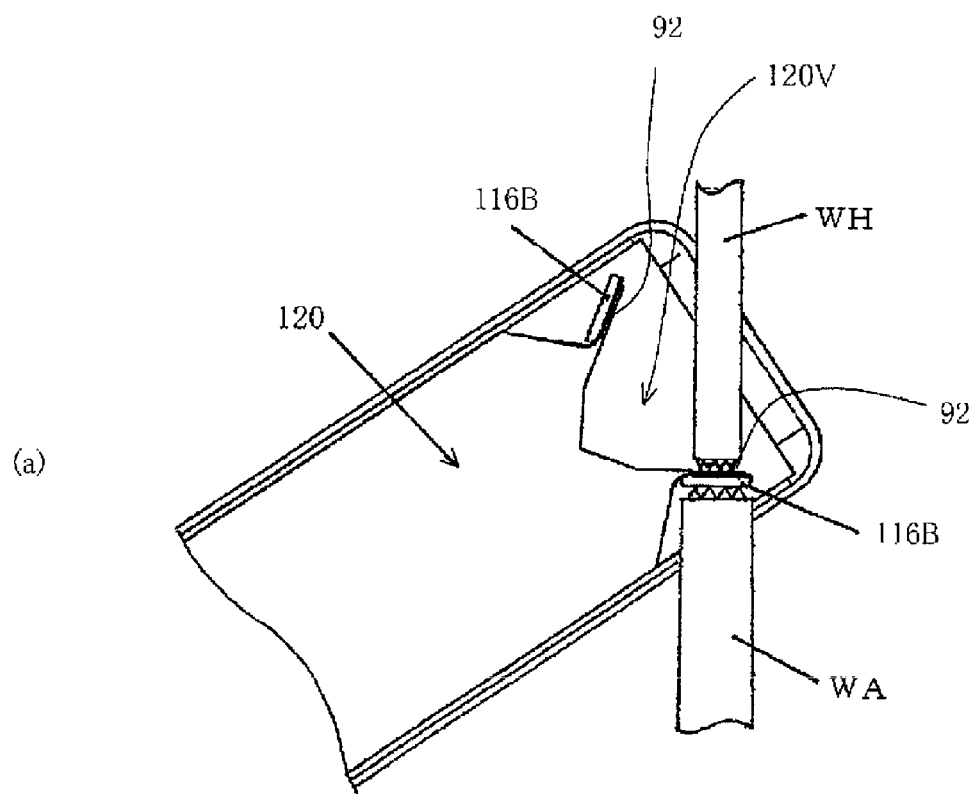
(a)
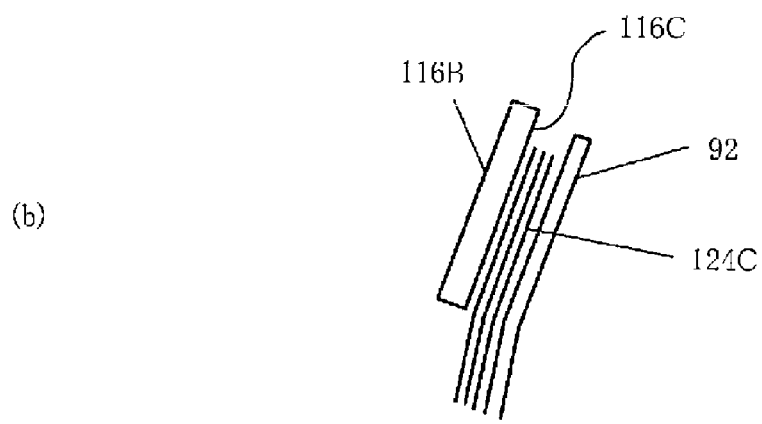
(b)

SQUARE BATTERY AND MANUFACTURING METHOD OF THE SAME

TECHNICAL FIELD

The present invention relates to a square battery in which its cross-sectional shape is formed to be a rectangular shape, a rectangular shape having round corners, or the like, and a manufacturing method of the same.

BACKGROUND ART

Hitherto, a square battery is known as a battery in which a higher volume density is obtained as compared with a cylindrical battery. In the square battery, a wound body formed by laminating and winding a band-like positive electrode and a band-like negative electrode together with a separator therebetween is contained in a square battery case, and an electrolyte is injected in the battery case.

In the square battery, non-coating parts of the positive electrode and the negative electrode are respectively protruded at both ends of the wound body in a winding axis direction, and electrode terminals or current collectors are connected to the non-coating parts, so that connection resistance is reduced by minimization of an energizing path, and the output is raised. Besides, this structure is effective also in compacting.

With respect to a connection form between a wound body and a current collector, for example, an electric storage device of patent document 1 is proposed.

In the electric storage device disclosed in patent document 1, a plate-like sheet connection part is inserted inside from an end surface of a non-coating part protruding from the wound body and both are connected.

CITATION LIST

Patent Literature

PTL 1: Japanese Patent No. 4061938

SUMMARY OF THE INVENTION

Technical Problem

In the electric storage device of patent document 1, when the sheet-like connection part is inserted into the non-coating winding inner peripheral part of the wound body at both ends in the axial direction, there is a case where a metal foil is bent or deformed, the winding center position of the foil to be extended becomes wrong, or when the sheet-like connection part is inserted, a part is bitten. Thus, the work of inserting the sheet-like connection part into the end surface of the wound body must be carefully performed so as not to damage the metal foil, and the improvement of workability is requested.

Solution to Problem (1) A square battery according to the invention includes a wound body in which a positive electrode sheet coated with a positive electrode active material and a negative electrode sheet coated with a negative electrode active material are wound together with a separator therebetween into a flat shape, a container in which the wound body is contained, a cover to seal the container, a positive electrode external terminal and a negative electrode external terminal provided on the cover, a positive electrode current collector to electrically connect a positive electrode connection part of the positive electrode sheet to the positive electrode external terminal, a negative electrode current collector to electrically connect a negative electrode connection part of the negative electrode sheet to the negative electrode external terminal, and spreading members to push and extend a laminate of the positive electrode sheet and a laminate of the negative electrode sheet from inside at both end surfaces of the wound body.

(2) It is preferable that the spreading members are provided on innermost peripheral sides of the positive electrode connection part of the positive electrode sheet and the negative electrode connection part of the negative electrode sheet laminated on both the end surfaces of the wound body.

(3) A shaft core around which the positive electrode sheet, the negative electrode sheet and the separator are wound is further provided, and the spreading members may be provided on the shaft core.

(4) A structure may be made such that a slit is formed in the shaft core and the spreading member is inserted in the slit.

(5) The spreading member includes a pair of metal thin plates, and a base part of the pair of metal thin plates may be inserted in the slit.

(6) The spreading member is constructed by folding one metal thin plate in half, and a bent base part may be inserted in the slit.

(7) The spreading members may be provided separately from the positive electrode sheet and the negative electrode sheet, or may be provided integrally with the positive electrode sheet and the negative electrode sheet.

(8) It is preferable that the connection part of the positive electrode sheet and the connection part of the negative electrode sheet are respectively sandwiched between the spreading members and the positive and negative electrode current collectors and are welded.

(9) A forked current collecting connection piece on which an inclined joint surface to sandwich the laminate of the positive or negative electrode sheet pushed and extended by the spreading member between itself and the pair of spreading members is formed may be provided in each of the positive and negative electrode current collectors.

(10) It is preferable that operation members protruding from both end surfaces of the wound body are provided on the spreading members.

(11) A manufacturing method according to the invention includes a step of forming a flat-shaped wound body by winding a positive electrode sheet and a negative electrode sheet together with a separator therebetween, a step of providing spreading members to push and extend laminates from inside to outside in insides of the laminates of a positive electrode connection part and a negative electrode connection part on which active materials of the positive electrode sheet and the negative electrode sheet are not coated and which are positioned at both end surfaces of the wound body in a winding axis direction, a step of spreading the spreading members to push and extend the laminates of the positive electrode connection part and the negative electrode connection part of the wound body from inside to outside, and a step of connecting the pushed and extended laminates to positive and negative electrode current collectors.

Advantageous Effects of Invention

According to the square battery of the invention and the manufacturing method of the same, the working efficiency of connection between the wound body and the current collector can be raised without damaging the positive and negative electrode sheets of the wound body.

BRIEF DESCRIPTION OF DRAWINGS

FIG. 3(a) is a perspective view of a cover assembly of the square battery of FIG. 1, and (b) is a view showing a shape of a current collector.

FIG. 7 A view for explaining a connection step of the current collector and the wound body.

FIG. 9 A view for explaining a state where the wound body and the current collector are ultrasonically welded to each other.

DESCRIPTION OF EMBODIMENTS

Embodiments in which a square battery of the invention is applied to a lithium-ion secondary battery will be described with reference to the drawings. Incidentally, scales and aspect ratios of the respective drawings are not coincident to each other for convenience of drawing, and the shapes and sizes of respective parts are the same in the respective drawings.

First Embodiment

[Structure of Square Battery]

Figure 1:
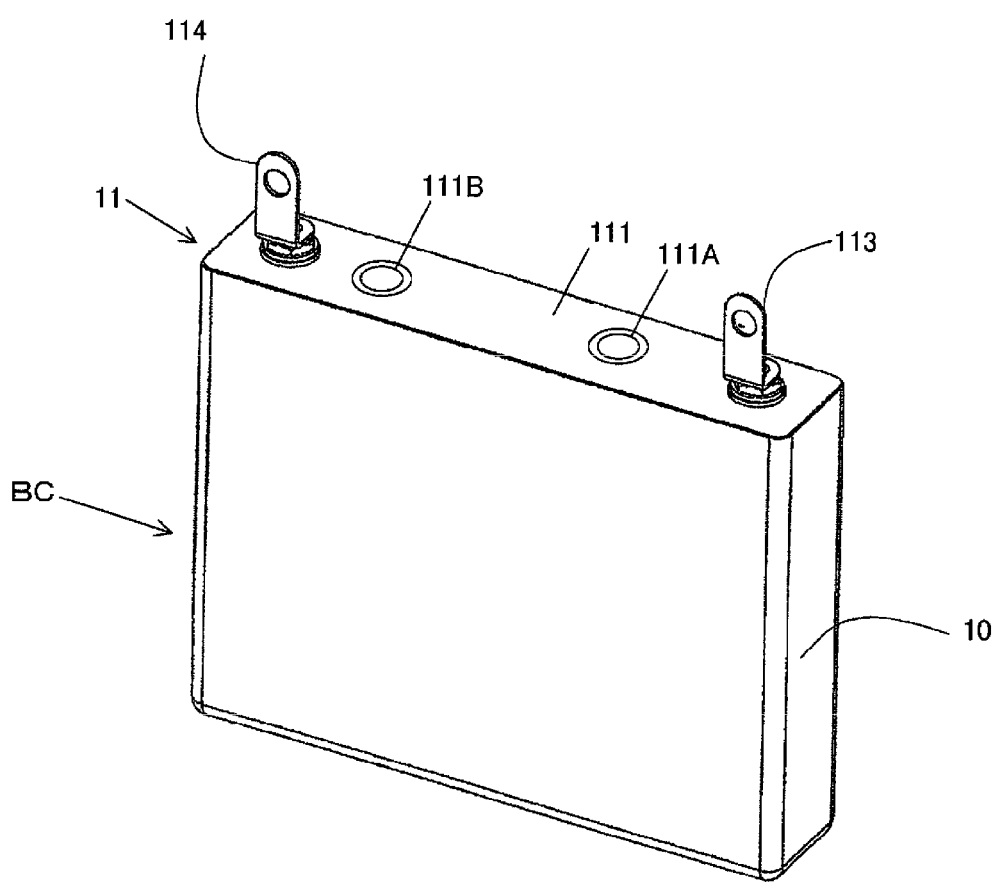
FIG. 1 A perspective view showing an outer appearance of a first embodiment of a square battery of the invention.
Figure 2:
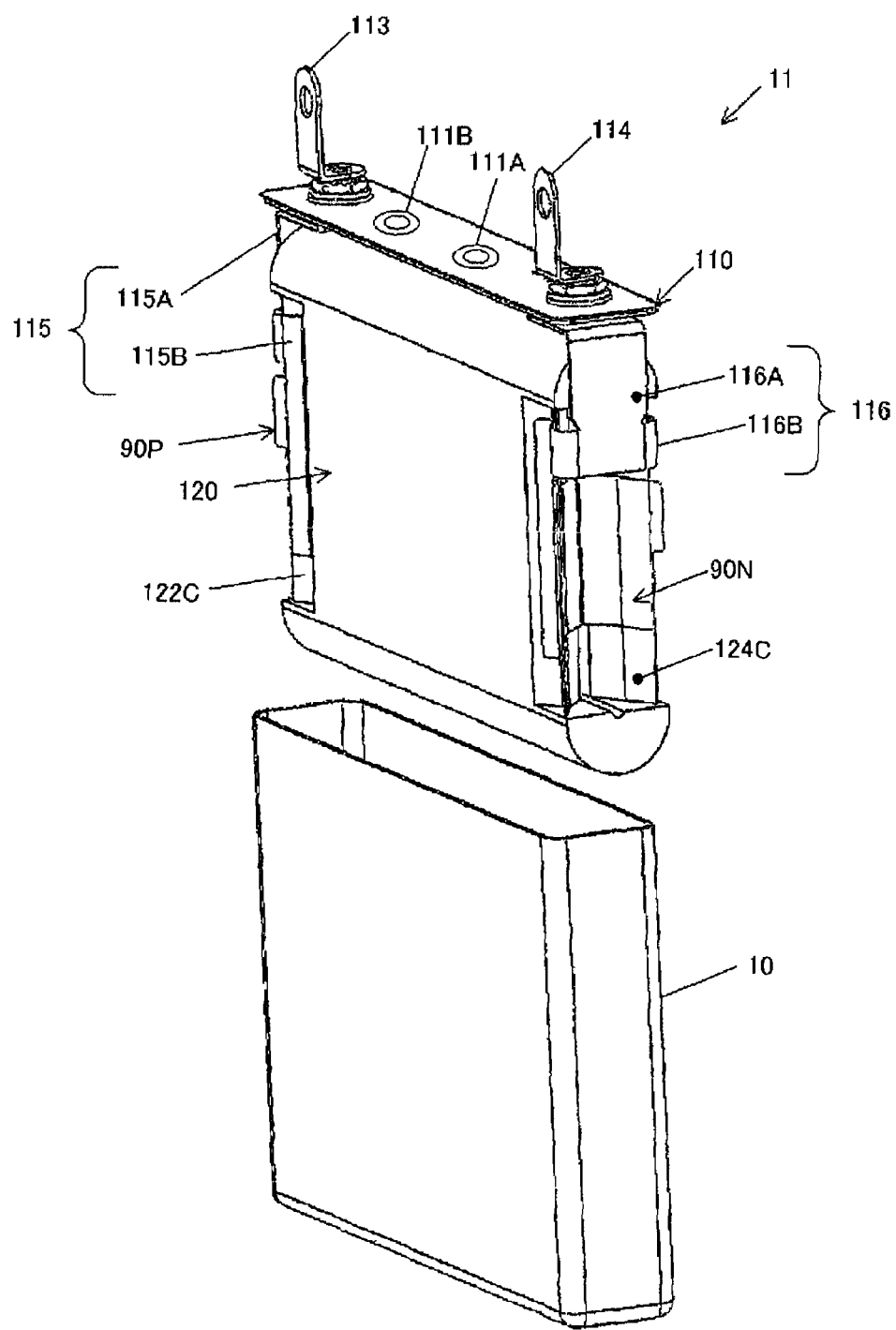
FIG. 2 A perspective view showing an assembling state of the square battery of FIG. 1.

As shown in FIG. 1, a lithium-ion battery BC includes a container 10 having an opening at one end, and a power generation element assembly 11 contained in the container 10 and shown in FIG. 2.

[Power Generation Element Assembly]

Figure 4:
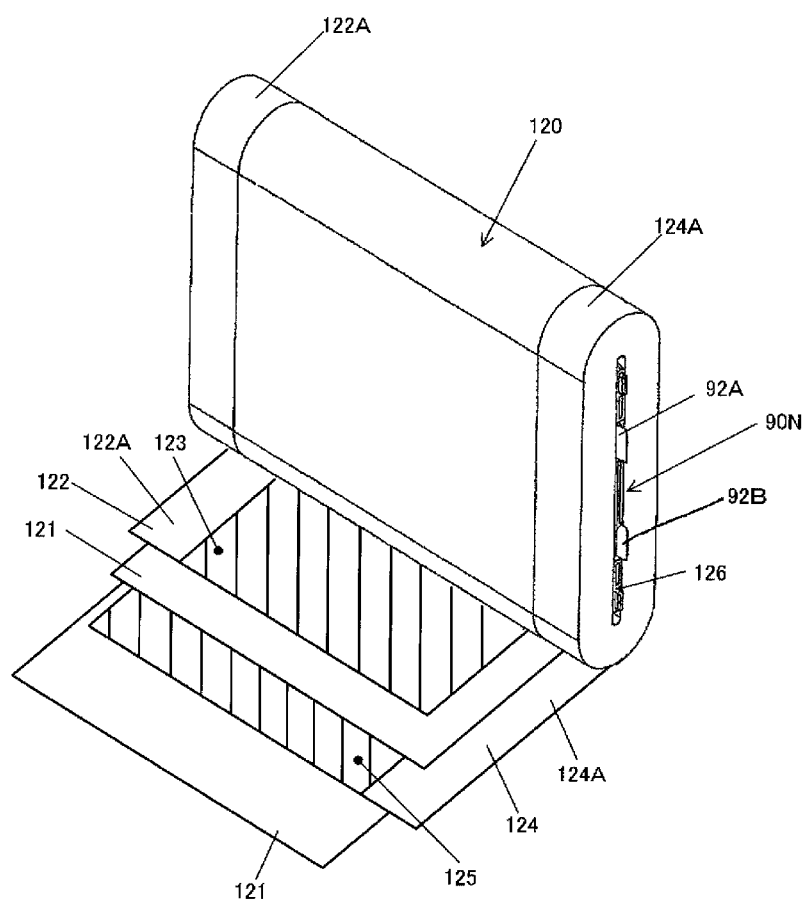
FIG. 4 A perspective view of a wound body of the square battery of FIG. 1.

As shown in FIG. 2, the power generation element assembly 11 includes a cover assembly 110 shown in FIG. 3 and a wound body 120 shown in FIG. 4.

[Cover Assembly]

As shown in FIG. 3, the cover assembly 110 includes a cover 111 to close the opening of the container 10, positive and negative electrode external terminals 113 and 114 protruding from the cover 111 through an insulating seal member 112, and positive and negative electrode current collectors 115 and 116 respectively connected to the positive and negative electrode external terminals 113 and 114. The positive and negative electrode external terminals 113 and 114 are electrically insulated from the cover 111 by the insulating seal member 112.

The positive electrode current collector 115 includes a base part 115A extending in a secondary battery bottom direction along a positive electrode side end surface of the wound body 120 in a winding axis direction, and a pair of positive electrode connection pieces 115B bifurcating from both lower end side surfaces of the base part 115A and extending in a container bottom direction. As shown in FIG. 3(b), the pair of connection pieces 115B are inclined so that the interval between the connection pieces becomes narrow toward a tip end when viewed from the above of the container 10. A pair of inner surfaces 115C of the pair of connection pieces 115B are joined to outer surfaces of a positive electrode non-coating part 122A (see FIG. 4) of the wound body 120 as described later.

Similarly, the negative electrode current collector 116 includes a base part 116A extending in the secondary battery bottom direction along a negative electrode side end surface of the wound body 120 in the winding axis direction, and a pair of negative electrode connection pieces 116B bifurcating from both lower end side surfaces of the base part 116A and extending in the contain bottom direction. Similarly to the connection pieces 115B, the pair of connection pieces 116B are also inclined so that the interval between the connection pieces becomes narrow toward the tip end when viewed from the above of the container 10. A pair of inner surfaces 116C of the pair of connection pieces 116B are joined to an outer surface of a negative electrode non-coating part 124A (see FIG. 4) of the wound body 120 as described later.

As described later, the wound body 120 is sandwiched such that the negative electrode connection part 124A is sandwiched between the pair of positive electrode connection pieces 115B at one end of the wound body 120, and the positive electrode connection part 122A is sandwiched between the pair of negative electrode connection pieces 116B at the other end of the wound body 120.

[Wound Body]

Figure 5:
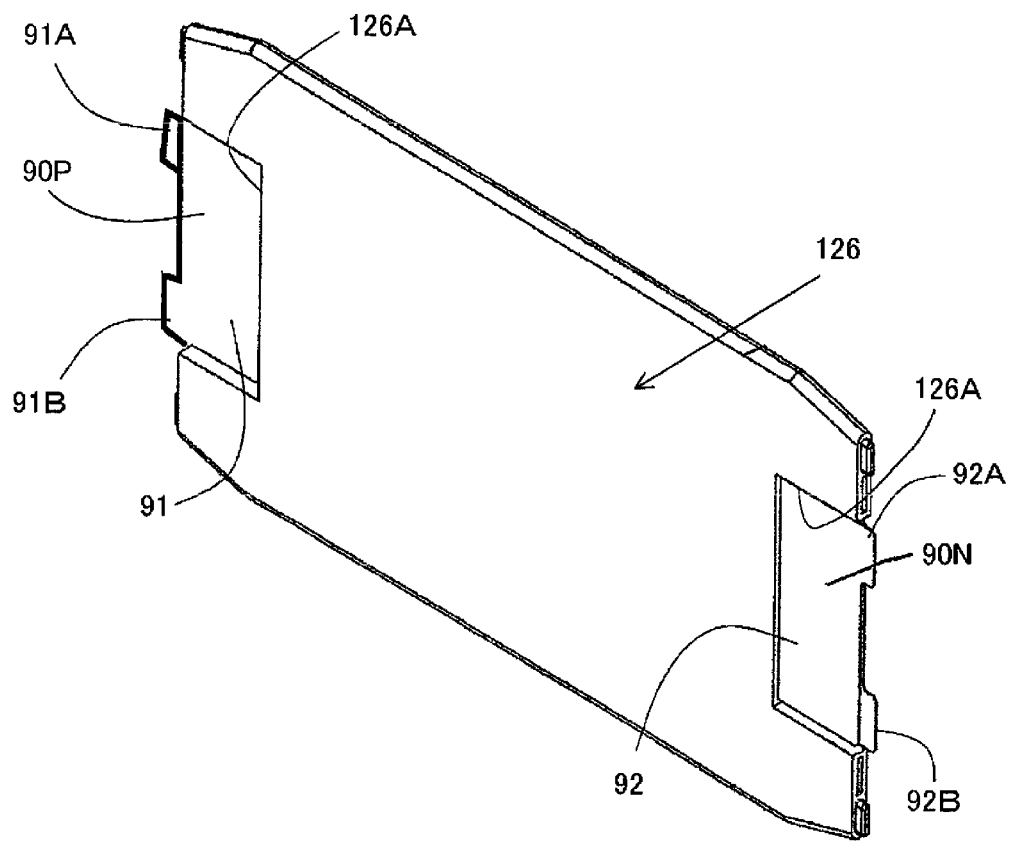
FIG. 5 A perspective view showing a shaft core and a spreading member of the square battery of FIG. 1.

As shown in FIG. 4, the wound body 120 is constructed such that a positive electrode foil (positive electrode sheet) 122 and a negative electrode foil (negative electrode sheet) 124, together with a separator 121 therebetween, are wound into a flat shape around a shaft core 126 shown in FIG. 5. The positive electrode foil 122 is an aluminum foil or an aluminum alloy foil, and the negative electrode foil 124 is a copper foil or a copper alloy foil. The separator 121 is a porous polyethylene resin.

A positive electrode active material (positive electrode) 123 is coated on both surfaces of the positive electrode foil 122, and a negative electrode active material (negative electrode) 125 is coated on both surfaces of the negative electrode foil 124. The positive electrode connection part (also called the non-coating part) 122A which is not coated with the positive electrode active material 123 and in which the positive electrode foil 122 is exposed is provided on one end of the wound body 120. The negative electrode connection part (also called the non-coating part) 124A which is not coated with the negative electrode active material 125 and in which the negative electrode foil 124 is exposed is provided on the negative electrode side end surface of the other side. As described later, the positive and negative electrode foils 122 and 124 are connected to the positive and negative electrode current collectors 115 and 116 at the positive and negative electrode connection parts 122A and 124A.

[Shaft Core]

The shaft core 126 will be described with reference to FIG. 5 and FIG. 6. The shaft core 126 is a plate-like member made of polypropylene resin and having a shape corresponding to the plane shape of the wound body 120. At both ends of the shaft core 126 in the winding axis direction, a negative electrode spreading operation plate (negative electrode spreading member) 90N is fitted to the negative electrode side end, and a positive electrode spreading operation plate (positive electrode spreading member) 90P is fitted to the positive electrode side end. Accordingly, in the lithium-ion secondary battery of the first embodiment, the spreading operation plates 90P and 90N are provided inside the innermost peripheries of the foils of the non-coating parts 122A and 124A.

The negative electrode spreading operation plate 90N includes two metal thin plates (blades) 92 made of the same material as the negative electrode foil 124, for example, copper or copper alloy. The positive electrode spreading operation plate 90P includes two metal thin plates (blades) 91 made of the same material as the positive electrode foil 122, for example, aluminum or aluminum alloy.

The negative electrode spreading operation plate 90N and the positive electrode spreading operation plate 90P have the same shape, and hereinafter, the negative electrode spreading operation plate 90N will be mainly described.

A recess 126A in which the spreading operation plate 90N is fitted is formed at both ends of the shaft core 126A in the winding axis direction, and a slit 126B is provided in the shaft core end surface of the recess 126A. A base part of the spreading operation plate 90N is inserted in the slit 126B so that the pair of blades 92 are spread. Operation protrusions 92A and 92B are provided on the pair of metal thin plates (blades) 92. As shown in FIG. 4, the operation protrusions 92A and 92B protrude from the flat end surface at one end of the wound body 120.

The operation protrusions 92A and 92B are gripped by fingers and the spreading operation plate 90N is spread, so that the foil laminate part of the non-coating part 124A is pushed and extended toward the outside in the thickness direction of the wound body 120 on the flat end surface of the wound body 120, and a V-shaped opening 120V continuous with the innermost periphery of the wound body 120 is formed. The same applies to the positive electrode side.

Figure 6:
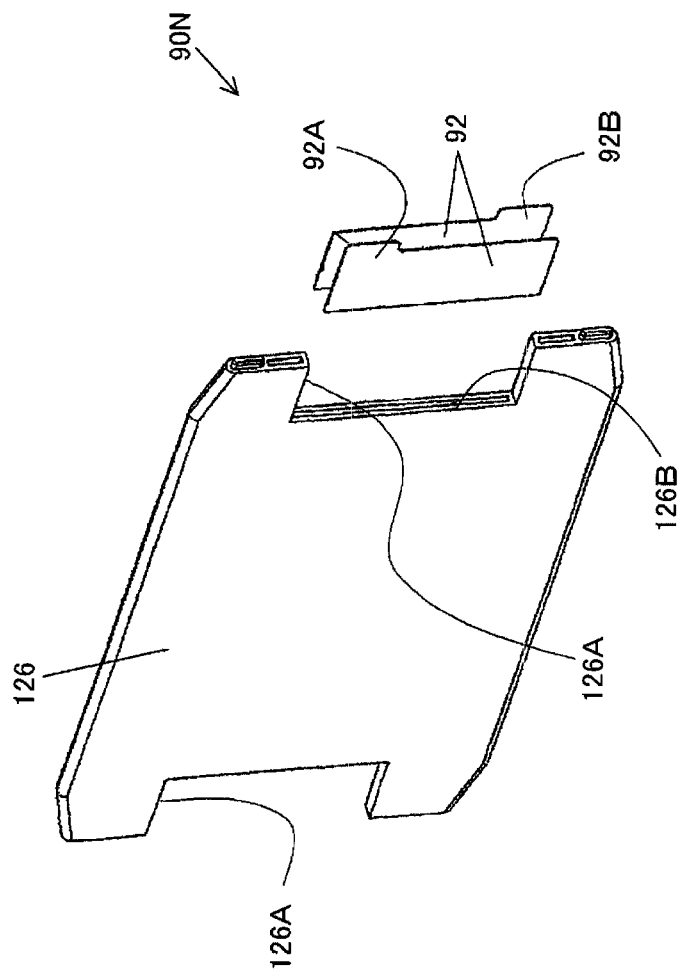
FIG. 6 An exploded perspective view of the shaft core and the spreading member of FIG. 5.

As shown in FIG. 4 to FIG. 6, the operation protrusions 92A and 92B are respectively arranged to be separate from each other in the long axis direction of the flat end surface. By this, the fingers can certainly grip the operation protrusions 92A and 92B, and the opening 120V is easily formed by the spreading operation plate 90N. The same applies to the positive electrode side.

As shown in FIG. 5 and FIG. 6, the spreading operation plates 90N and 90P are received in the recesses 126A, so that the shaft core 126 and the spreading operation plates 90N and 90P as a whole form a rectangle having substantially the same length as the winding axis length of the wound body 120. Owing to this, the wound body 120 is not enlarged by the existence of the spreading operation plates 90N and 90P.

Since the metal thin plates 91 and 92 are electrically connected and welded to the non-coating parts 122A and 124A, the metal thin plates 91 and 92 are preferably made of the material having the same polarity as the positive electrode foil 122 and the negative electrode foil 124.

A manufacturing process of the square battery as stated above will be described.

[Assembling of the Square Battery]

The cover assembly 110 and the wound body 120 are integrated to fabricate the power generation element assembly 11 shown in FIG. 2, and the power generation element assembly 11 is inserted in the container 10. The cover 111 is laser welded to the container 10 and the container 10 is sealed. A liquid injection port is provided in the cover 111, and after the cover 111 is welded to the container 10, an electrolyte (not shown) is injected into the container 10 through the injection port. After the electrolyte is injected, a liquid injection plug 111A is laser welded to the liquid injection port and the port is sealed. The gaskets 112 made of insulating resin are fitted to the positive and negative electrode external terminals 113 and 114, so that electrical insulation from the cover 111 is obtained, and at the same time, water sealing between the positive and negative electrode external terminals 113 and 114 and the cover 111 is attained. Reference numeral 111B denotes a gas discharge port.

[Assembling of the Power Generation Element Assembly]

The assembling procedure of the power generation element assembly 11 will be described.

First, the wound body 120 shown in FIG. 4 is formed. That is, the separator 121 is wound one or more turns around the shaft core 126 shown in FIG. 5, and the positive electrode foil 122 and the negative electrode foil 124 are laminated and wound while being insulated by the separator 121. The separator 121 of the outermost surface of the wound body 120 is secured by a not-shown tape.

Before the wound body 120 and the current collectors 115 and 116 are integrated, the non-coating parts 122A and 124A of the wound body 120 are crushed and deformed in the thickness direction. The wound body 120 is inserted between the pair of connection pieces 115B of the positive electrode current collector 115 and the pair of connection pieces 116B of the negative electrode current collector 116, so that the inner surfaces 115C of the pair of forked connection pieces 115B of the positive electrode current collector 115 contacts the outer surface of the positive electrode connection part 122A of the wound body 120, and the inner surfaces 116C of the pair of forked negative electrode connection pieces 116B of the negative electrode current collector 116 contact the outer surface of the negative electrode connection part 124A. This state is shown in FIG. 7(a). FIG. 7(a) is a cross-sectional view of the negative electrode side end of the square battery.

The positive electrode blade 91 is a thin aluminum plate, and the positive electrode current collector 115 is formed of aluminum. Besides, the positive electrode foil 122 is an aluminum foil and is multiply stacked in the wound body 120. The negative electrode blade 92 is a thin copper plate, and the negative electrode current collector 116 is formed of copper. Besides, the negative electrode foil 124 is a copper foil and is multiply stacked in the wound body 120.

Figure 8:
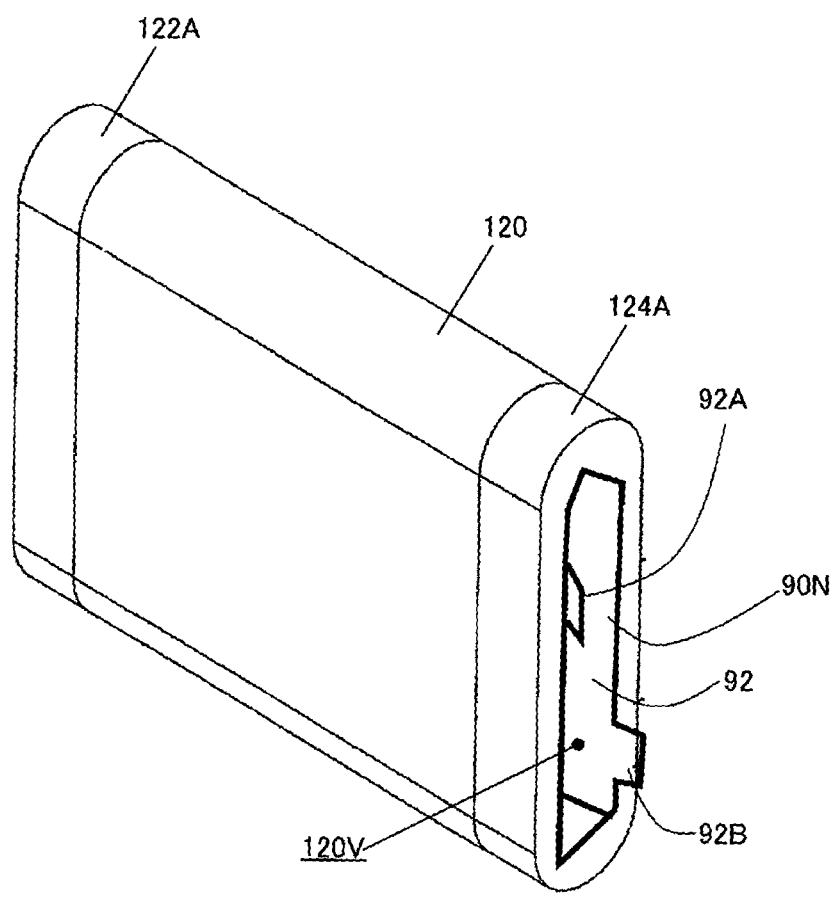
FIG. 8 A perspective view showing an end surface of the wound body pushed and extended by the spreading member.

After the wound body 120 is inserted between the current collectors 115 and 116, as shown in FIG. 7(b), the operation protrusions 92A and 92B of the pair of blades 92 of the spreading operation plate 90N are gripped by fingers and are opened, so that a laminate 124C of the negative electrode connection part 124A is opened from the inner peripheral side to the outside at the end surface of the wound body 120, and as shown also in FIG. 8, the laminate 124C at the end surface of the wound body 120 is spread into a V-shape. The same applies to the end surface of the positive electrode connection part 122A.

After non-coating part laminates 122C and 124C at both the end surfaces of the wound body 120 are pushed and spread to the outside by the spreading operation plates 90P and 90N, as shown in FIG. 9, the laminate 124C of the negative electrode current collecting part (non-coating part) 124A is sandwiched between the forked negative electrode connection pieces 116B and the metal thin plate 92 by a vibrator WH and a stator WA of ultrasonic joining. Although not shown, similarly, the laminate 122C of the positive electrode current collecting part (non-coating part) 122A is sandwiched between the forked positive electrode connection plate 115B and the metal thin plate 91. The non-coating part laminate 124C is sandwiched between the joint surface 116C of the negative electrode connection piece 116B and the negative electrode blade 92 and is ultrasonically joined. Joining is similarly performed also at the positive electrode side. By this, the wound body 120 is electrically connected to the positive and negative electrode current collectors 115 and 116.

The non-coating parts 122A and 124A are welded to the connection pieces 115B and 116B at, for example, two places in the circumferential direction, so that current flowing paths from the positive electrode foil 122 and the negative electrode foil 124 to the current collectors 115 and 116 can be shortened, the connection resistance can be reduced, and the output of the battery can be raised.

Figure 10:
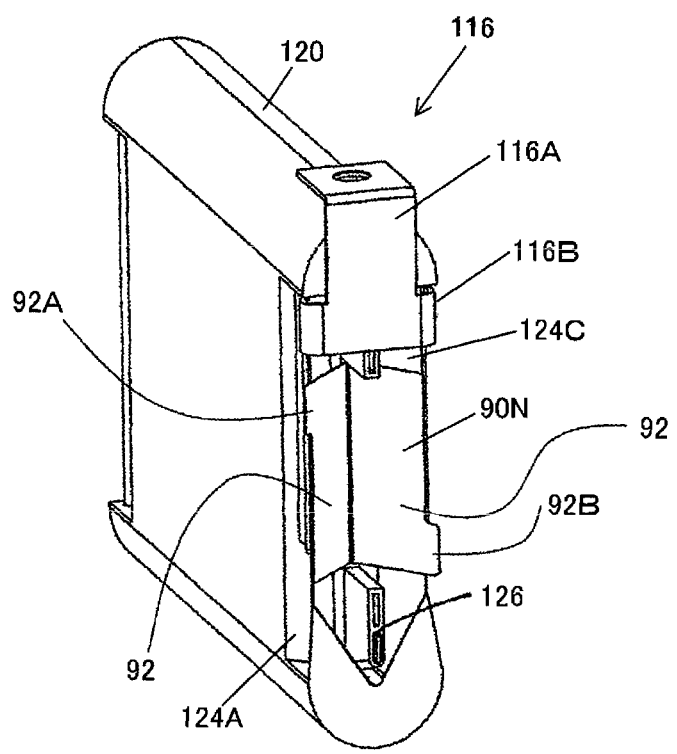
FIG. 10 A perspective view in which the first embodiment of the square battery of the invention is seen from a negative electrode end surface of the wound body.

By the assembling procedure described above, as shown in FIG. 10, the negative electrode non-coating parts 124A exposed on the front and back surfaces of the wound body 120 is integrated with the metal thin plate 92 and the connection piece 116B of the negative electrode current collector 116 and is connected. Besides, although not shown, the positive electrode non-coating parts 122A exposed on the front and back surfaces of the wound body 120 is integrated with the metal thin plate 91 and the connection piece 115B of the positive electrode current collector 115 and is connected.

The manufacturing process described above includes a step of forming a flat-shaped wound body by winding a positive electrode sheet and a negative electrode sheet together with a separator therebetween, a step of providing spreading members to push and extend laminates from inside to outside of a positive electrode connection part and a negative electrode connection part on which active materials of the positive electrode sheet and the negative electrode sheet are not coated and which are positioned at both end surfaces of the wound body in a winding axis direction, a step of spreading the spreading members to push and extend the laminates of the positive electrode connection part and the negative electrode connection part of the wound body from inside to outside, and a step of connecting the pushed and extended laminates to positive and negative electrode current collectors.

The square lithium-ion battery of the first embodiment described above has operations and effects as described below.

(1) The spreading operation plates 90P and 90N are provided at the winding centers of the laminates 122C (124C) of the non-coating parts 122A and 124A positioned at both the ends of the wound body 120 in the winding axis direction, and the laminates 122C (124C) are pushed and spread from the inside by the opening operation of the spreading operation plates 90P and 90N. Thus, the laminates 122C (124C), which are easily damaged, can be easily spread, and the positive and negative non-coating parts 122A and 124A can be connected to the positive and negative electrode current collectors 115 and 116 without damaging the positive and negative electrode foils 122 and 124.

(2) At the winding centers of the non-coating part laminates 122C (124C) wound into multiple oval shapes at both the ends of the wound body 120, the spreading operation plates 90P and 90N are provided at the innermost periphery or the inside thereof. Thus, the electrode foils of the non-coating parts which are liable to be bent or deformed can be easily and certainly bundled and joined relative to the joint surfaces 115C and 116C of the current collectors 115 and 116. By this, joining can be performed at high working efficiency, the productivity can be raised, and the cost can be reduced.

(3) Since the openings 120V are formed by the spreading operation plates 90P and 90N provided inside the innermost peripheral foils of the non-coating parts 122A and 124A, the layer of the electrode foil to be spread is not mistaken or is not bitten. By this, high working efficiency and high productivity can be realized, and production cost can be reduced.

(4) The recesses 126A are provided at both the ends of the shaft core 126 in the winding axis direction, the spreading operation plates 90P and 90N are received in the recesses 126A, and the shaft core 126 having substantially the rectangular shape as a whole is constructed. Accordingly, even if the spreading operation plates 90P and 90N are provided, the wound body 120 is not enlarged.

(5) The operation protrusions 91A and 91B and the operation protrusions 92A and 92B, which are operated by fingers, are provided on the spreading operation plates 90P and 90N, and these operation protrusions 91A to 92B protrude from both the end surfaces of the wound body 120. Accordingly, the spreading operation plates 90P and 90N can be easily operated. Further, since the operation protrusions 91A and 91B and the operation protrusions 92A and 92B are provided to be separate from each other in the longitudinal direction of the blades 91 and 92, the operation protrusions can be certainly operated by fingers.

Second Embodiment

Next, a second embodiment in which a square battery of the invention is applied to a lithium-ion battery will be described with reference to FIG. 11. Incidentally, the same or similar portion to the first embodiment is denoted by the same reference numeral and its description will be omitted.

In the second embodiment, positive and negative electrode side spreading operation plates 190P and 190N respectively formed of one metal thin plate are provided inside the innermost peripheries of non-coating parts 122A and 124A. Hereinafter, a spreading operation plate 190 will be described. The spreading operation plates 190P and 190N are respectively formed of aluminum and copper.

Figure 11:
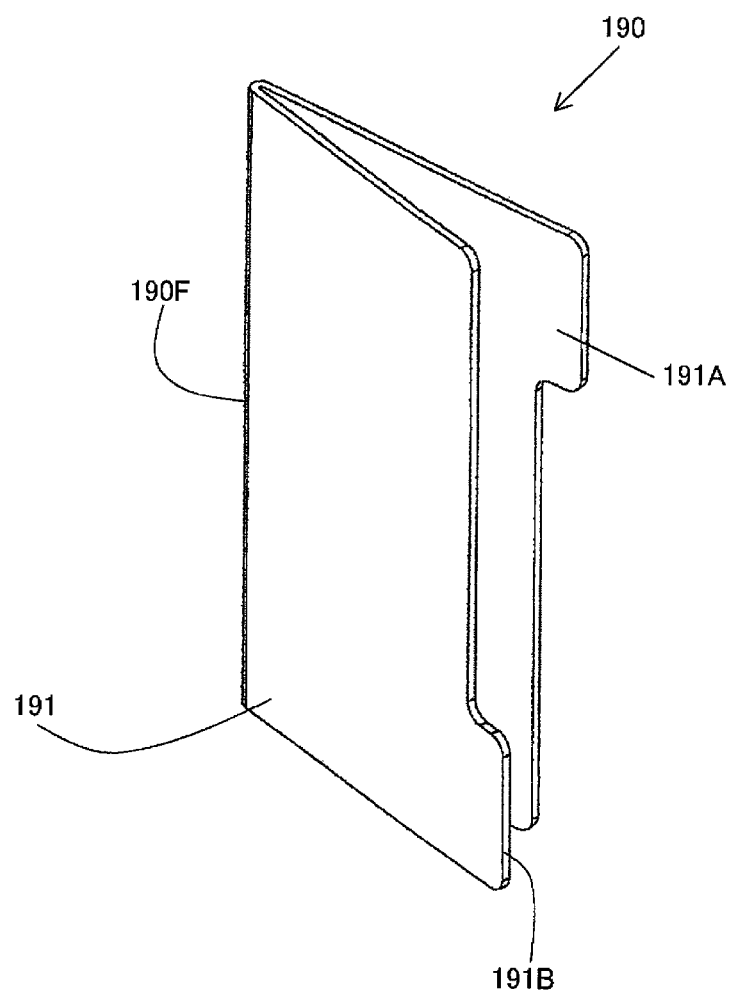
FIG. 11 A view showing another example of a spreading member.

As shown in FIG. 11, the spreading operation plate 190 is constructed by folding one metal thin plate 191 having operation protrusions 191A and 191B in half at the center. A bent part 190F where the metal thin plate 191 is bent is not completely plane, but has a slight bulge, and therefore, the bent part becomes thick. Accordingly, when the spreading operation plate 190 is inserted in a slit 126B, the spreading operation plate 190 is press-inserted in the slit 126B in a tight-fit state. By this, the spreading operation plate 190 can be positioned and fixed more firmly than the first embodiment. Further, since the spreading operation plate 190 is unified, the number of parts is decreased and manufacturing cost is also reduced.

Incidentally, the other structure and the manufacturing method of the second embodiment are the same as those of the first embodiment.

Third Embodiment

Next, a third embodiment in which a square battery of the invention is applied to a lithium-ion battery will be described with reference to FIG. 12. Incidentally, the same or similar portion to the first embodiment is denoted by the same reference numeral and its description will be omitted.

A spreading operation plate 290 of the third embodiment includes two metal thin plates 291 each being formed with a projection 291R extending in a longitudinal direction of a slit 126B, and the respective metal thin plates 291 are provided inside the innermost peripheries of non-coating parts 122A and 124A. Incidentally, the spreading operation plate for the positive electrode is made of aluminum, and the spreading operation plate for the negative electrode is made of copper.

Figure 12:
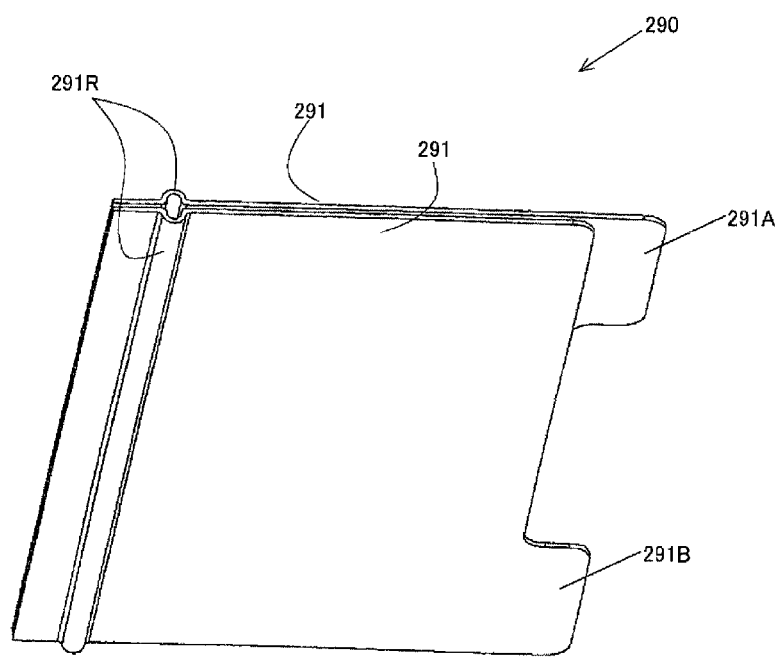
FIG. 12 A view showing still another example of a spreading member.

As shown in FIG. 12, similarly to the first embodiment, the spreading operation plate 290 is made of the pair of metal thin plates 291, and the projections 291R extending in a width direction (longitudinal direction of the slit 126B) along the inner ends of the respective metal thin plates 291 in the winding axis direction, that is, along the ends on the slit 126B side are formed by press working. When the spreading operation plate 290 is inserted in the slit 126B, the projections 291R are press-inserted in the slit 126B, and by this, similarly to the second embodiment, the spreading operation plate 290 is firmly positioned and fixed.

Incidentally, the other structure and the manufacturing method of the third embodiment are the same as those of the first embodiment.

Fourth Embodiment

A fourth embodiment in which a square battery of the invention is applied to a lithium-ion battery will be described with reference to FIG. 13. Incidentally, the same or similar portion to the first embodiment is denoted by the same reference numeral and its description will be omitted.

In the fourth embodiment, the invention is applied to a wound body 120 in which positive and negative electrode foils are wound without using a shaft core. Also in the fourth embodiment, spreading operation plates 390P and 390N are provided on the inner peripheral sides of the innermost peripheral foils of non-coating parts 122A and 124A. As the spreading operation plates 390N and 390P, for example, the two metal thin plates 91 or 291 shown in FIG. 6 or FIG. 12 can be used, or the one metal thin plate 191 shown in FIG. 11 and folded in half can be used.

Figure 13:
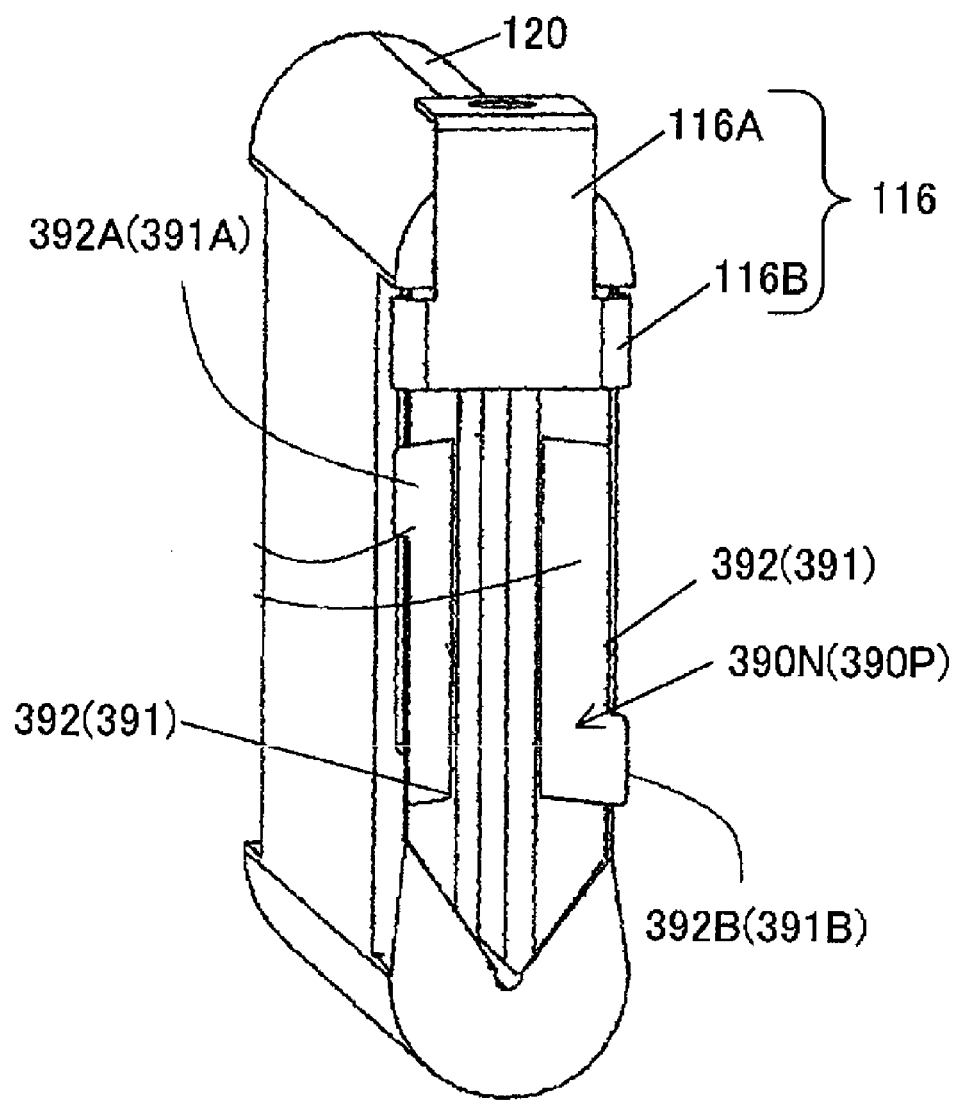
FIG. 13 A perspective view in which a fourth embodiment of a square battery of the invention is seen from a negative electrode end surface of a wound body.

As shown in FIG. 13, the wound body 120 is such that the spreading operation plates 390N and 390P are arranged on the innermost periphery, a separator 121 is wound one turn or several turns around it, and then, a positive electrode foil 122, a negative electrode foil 124 and the separator 121 are laminated and wound while the separator 121 intervenes therebetween.

Since protrusions 392A and 392B of the spreading operation plate 390N protrude from the negative electrode side end surface of the wound body 120, when the operation protrusions are operated and the spreading operation plate 390N is spread, a V-shaped opening 120V can be formed. The non-coating part 122A of the positive electrode side end surface is also similarly spread, and the V-shaped opening 120V can be formed.

The wound body 120 without using the shaft core can be constructed, for example, as described below.

The one metal thin plate 391 is joined to the innermost periphery of the positive electrode non-coating part 122A, and the other metal thin plate 392 is joined to the innermost periphery of the negative electrode non-coating part 124A, so that the spreading operation plates 390N and 390P are fixed and held to the wound body 120. The positive and negative electrode foils 122 and 124 as stated above are wound together with the separator 121 therebetween and the wound body 120 can be fabricated.

As a joining method of the spreading operation plates 390P and 390N to the non-coating parts 122A and 124A, ultrasonic welding, welding such as resistance welding, a temporal fixing method using an adhesive or an adhesive tape, or the like can be adopted.

Alternatively, a separator is wound plural turns around a pair of spreading operation plates 390P (390N) separated from each other by a distance corresponding to the width of the wound body 120 and is unified, and the positive electrode foil 122 and the negative electrode foil 124 are laminated and wound around the outer periphery of the unified element while they are insulated by the separator. In this way, the wound body 120 can be constructed without using the shaft core.

Incidentally, the other structure and the manufacturing method of the fourth embodiment are the same as those of the first embodiment.

Fifth Embodiment

Next, a fifth embodiment in which a square battery of the invention is applied to a lithium-ion battery will be described with reference to FIG. 14. Incidentally, the same or similar portion to the first embodiment is denoted by the same reference numeral and its description will be omitted.

In the fifth embodiment, spreading operation plates 490P and 490N are formed integrally with a positive electrode foil 122 and a negative electrode foil 124. That is, in the fifth embodiment, in the respective electrode foils 122 and 124, the spreading operation plate 490P is made of the positive electrode foil 122 and the spreading operation plate 490N is made of the negative electrode foil 124 at specified places of the innermost peripheral foils of non-coating parts 122A and 124A.

Figure 14:
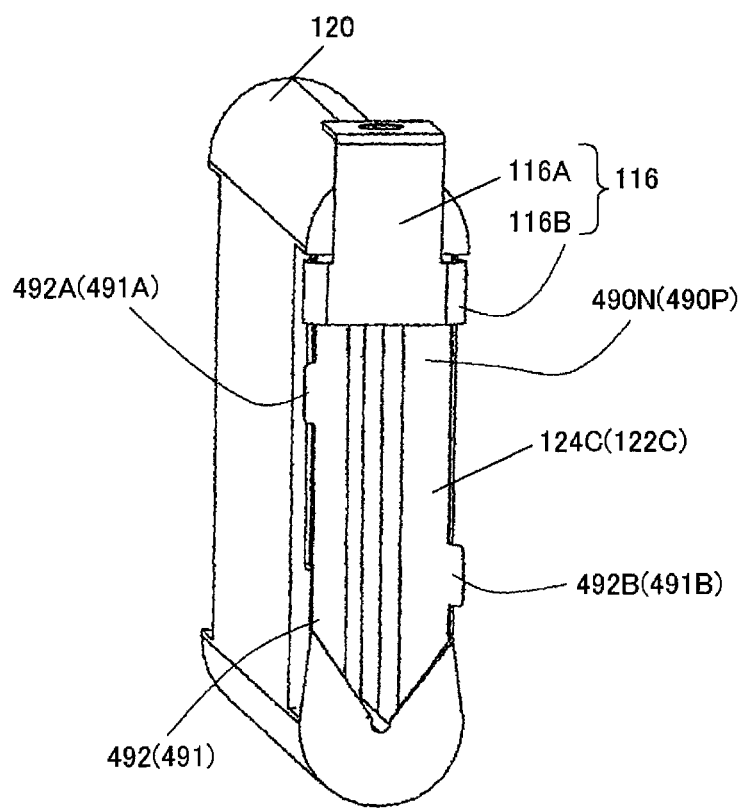
FIG. 14 A perspective view in which a fifth embodiment of a square battery of the invention is seen from a negative electrode end surface of a wound body.

As shown in FIG. 14, operation protrusions 492A and 492B are previously integrally formed on the electrode foil positioned on the innermost periphery of the negative electrode foil 124, and at the time of formation of the wound body 120, the operation protrusions 492A and 492B protrude from the innermost peripheral non-coating part 124A on the flat side surface. When the operation protrusions 492A and 492B are spread by fingers or the like, an opening 120V can be easily formed similarly to the first embodiment. The same applies to the positive electrode side.

That is, the spreading operation plates (spreading members) of the fifth embodiment are the operation protrusions 491A, 492A and 491B, 492B protruding in the winding axis direction from the side edges of the positive and negative electrode non-coating parts 122A and 124A. Accordingly, it is not necessary to prepare a spreading operation plate as an independent component, and effects such as reduction of the number of parts and reduction of manufacturing cost can be obtained in addition to the effects of the first embodiment.

Incidentally, the other structure and the manufacturing method of the fifth embodiment are the same as those of the first embodiment.

MODIFIED EXAMPLES (1) In the first embodiment, although the spreading operation plates 90P and 90N are inserted in the slits 126B and are fixed to the shaft core 126, they can also be naturally fixed by adhesive. Alternatively, the spreading operation plates 90P and 90N can be fixed by melting part of the shaft core 126 by heat and by welding it to the spreading operation plate 90.

(2) In the fifth embodiment, although the operation protrusion is protrudingly provided on the non-coating part, another arbitrary shape which can be gripped by fingers or the like, for example, a slight bulge on the side edge of the non-coating part may be adopted.

(3) Although the spreading operation plates are protruded from both the end surfaces of the wound body 120 in the winding axis direction, if the spreading operation plate has high rigidity, the operation protrusion is not required to be protruded from the end surface of the wound body. In this case, a pair of plate members having rigidity to a certain degree have only to be arranged to be opposite to each other in the innermost peripheral space of the non-coating part of the wound body end surface.

The above description relates to the embodiments, and the invention can be applied to square batteries having various structures not departing from the gist of the invention.

Accordingly, the invention can be applied to various square batteries including a wound body in which a positive electrode sheet coated with a positive electrode active material and a negative electrode sheet coated with a negative electrode active material are wound together with a separator therebetween into a flat shape, a container in which the wound body is contained, a cover to seal the container, a positive electrode external terminal and a negative electrode external terminal provided on the cover, a positive electrode current collector to electrically connect a positive electrode connection part of the positive electrode sheet to the positive electrode external terminal, a negative electrode current collector to electrically connect a negative electrode connection part of the negative electrode sheet to the negative electrode external terminal, and spreading members to push and extend a laminate of the positive electrode sheet and a laminate of the negative electrode sheet from inside at both end surfaces of the wound body.

REFERENCE SIGNS LIST

BC: square battery
10: container
11: power generation element assembly
110: cover assembly
111: cover
113: positive electrode external terminal
114: negative electrode external terminal
115: positive electrode current collector
116: negative electrode current collector
115A, 116A: current collector base part
115B, 116B: current collector connection piece
115C, 116C: ultrasonic joint surface
120: wound body
121: separator
122: positive electrode foil
123: positive electrode
124: negative electrode foil
125: negative electrode
126: shaft core
126A: recess
126B: slit
120V, 120U: opening
90, 90P, 90N, 190, 290, 390P, 390N, 490P, 490N: spreading operation plate (spreading member)
91, 92, 191, 291, 391, 392, 491, 492: blade (metal thin plate)
91A, 91B, 92A, 92B, 191A, 191B, 291A, 291B, 391A, 391B, 392A, 392B, 491A, 491B, 492A, 492B: operation protrusion
190F: bent part
291R: projection
WA: stator (anvil)
WH: vibrator (horn)

The invention claimed is:

1. A square battery comprising:
a wound body in which a positive electrode sheet coated with a positive electrode active material and a negative electrode sheet coated with a negative electrode active material are wound together with a separator therebetween into a flat shape;
a container in which the wound body is contained;
a cover to seal the container;
a positive electrode external terminal and a negative electrode external terminal provided on the cover;
a positive electrode current collector to electrically connect a positive electrode connection part of the positive electrode sheet to the positive electrode external terminal;
a negative electrode current collector to electrically connect a negative electrode connection part of the negative electrode sheet to the negative electrode external terminal;
spreading members to push and extend a laminate of the positive electrode connection part of the positive electrode sheet and a laminate of the negative electrode connection part of the negative electrode sheet from inside at both end surfaces of the wound body;
a shaft core around which the positive electrode sheet, the negative electrode sheet and the separator are wound is further provided, and
the spreading members are provided on the shaft core;
wherein:
a slit is formed in the shaft core, and
the spreading member is inserted in the slit.

2. The square battery according to claim 1, wherein:
the spreading members are provided on innermost peripheral sides of the positive electrode connection part of the positive electrode sheet and the negative electrode connection part of the negative electrode sheet laminated on both the end surfaces of the wound body.

3. The square battery according to claim 1, wherein:
the spreading member includes a pair of metal thin plates, and a base part of the pair of metal thin plates is inserted in the slit.

4. The square battery according to claim 1, wherein:
the spreading member is constructed by folding one metal thin plate in half, and a bent base part is inserted in the slit.

5. The square battery according to claim 1, wherein:
the spreading members are provided separately from the positive electrode sheet and the negative electrode sheet.

6. The square battery according to claim 1, wherein:
the spreading members are provided integrally with the positive electrode sheet and the negative electrode sheet.

7. The square battery according to claim 1, wherein:
the laminate of the positive electrode connection part of the positive electrode sheet is sandwiched between the spreading members and the positive electrode current collectors and are welded, and the laminate of the negative electrode connection part of the negative electrode sheet is sandwiched between the spreading members and the negative electrode current collectors and are welded.

8. The square battery according to claim 7, wherein:
each of the positive and negative electrode current collectors includes a forked current collecting connection piece on which an inclined joint surface to sandwich the laminate of the positive or negative electrode sheet pushed and extended by the spreading member between itself and the pair of spreading members is formed.

9. The square battery according to claim 1, wherein:
the spreading members include operation members protruding from both the end surfaces of the wound body.

* * * * *